3,012,896 
PRECOOKED FROZEN FOOD COMPOSITION AND METHOD OF PREPARING SAME
Moe Phillip Katz, 2805 Farm Road, Alexandria, Va.
No Drawing. Filed Feb. 2, 1959, Ser. No. 790,373
2 Claims. (Cl. 99—193)

This invention relates to new and useful precooked frozen food compositions ordinarily classified as delicacies.

More specifically, this invention relates to a new and useful at least partially precooked frozen food composition comprising an edible bulb and shortening.

The dish known as lox and eggs is well known, and its preparation also is well known. However, it has heretofore been necessary to prepare this dish in only such an amount as can be consumed at each sitting, and there is not presently known any method for so preparing this dish that it may be prepared, frozen, and stored until it is to be served. Prior hereto, this dish has been prepared for each sitting and consumed in its entirety at each such sitting for the reason that no combination of the required ingredients together with a necessary preservative and/or freezing agent has been found which enables the preparation of a large quantity of this combination of ingredients which can be made and stored until required. This dish is usually made by placing butter in a frying pan, melting the butter, adding the onion in sliced form, the lox, and the egg to the so-melted butter, and then heating the so-formed mixture, while stirring, until the combination has been thoroughly cooked. In the preparation of such a dish it is undesirable to add to the combination of ingredients thereof any synthetic preservatives or other agents, in addition to the ingredients already present, for any reason whatsoever for the reason that this dish must at all times retain its own and original flavor, its own natural juices, and its own taste characteristics which render it a delicacy. Therefore, it has heretofore been necessary to prepare this dish in small portions for each required sitting, and the preparation thereof is time consuming.

By way of introduction, an onion is an edible bulb, and there are several known varieties of onions. Red onions, commonly known as Bermuda onions, are the strongest in flavor and are followed by the milder yellow and the very mild white varieties of onions. The onion is an edible bulb of Alium cepa, a Liliaceae and is ordinarily used as a condiment, food, and for the preparation of a syrup.

Butter is a food used in cooking as a shortening and as a flavoring ingredient and is prepared by churning cream and usually contains not less than 80% of milk fat, some water, vitamins, small quantities of proteins, lactose and mineral salts.

Lox is marinated and smoked salmon. It is prepared by soaking the salmon sides in a strong marinating solution, which may be a strong brine solution or a water solution containing sugar and sour cream, for several, viz. 10 to 14, days and then smoking the so-marinated fish sides in the presence of cool or hot smoke for an extended period of time lasting anywhere from 14 hours to 4 or 5 days. The method of preparing lox is not part of my invention, for the so-described method is well known together with the other known methods. The use of other marinated and/or smoked fish materials, including herring, as well as such materials as cooked liver is within the scope of my invention.

An object of my invention is to provide a precooked frozen food composition comprising an edible bulb and a shortening, said composition being such as can be stored for a long period of time and then be thawed out and prepared for eating without the loss of any of its original flavor, natural juices, and taste characteristics of a freshly prepared composition.

Another object of my invention is to provide an at least partially precooked frozen food composition comprising an edible bulb and a shortening, said composition being such as can be stored for a long period of time and then be thawed out and prepared for eating without the loss of any of its original flavor, natural juices, and taste characteristics of a freshly prepared composition.

Other objects of my invention will become readily apparent from the following detailed description which is merely illustrative of my invention and does not limit my invention.

I have prepared for the first time a precooked frozen food composition containing an edible bulb and a shortening in admixture with each other and with lox which can be prepared in quantities sufficient for many portions at several sittings and which can be stored for long periods of time without any loss of flavor, natural juices, and taste characteristics associated with the freshly prepared combination of said ingredients. I preferably prepare my composition in the following manner: The onion is first diced and added to a pan, and the shortening is then added to the pan having therein the onion in particulate form. The shortening used is preferably butter, but other shortening materials can be used in place of said butter or can be used in place of a portion of said butter, depending upon the particular flavoring characteristics desired in the final prepared dish, such shortening materials including margarine, which is a butter substitute usually consisting of a solid emulsion of fats in milk serum and is usually made by hydrogenation of liquid fat, and hydrogenated vegetable fats. The shortening material is preferably a shortening which is in the solid state at room temperature. The mixture of the shortening and onion is then heated and stirred simultaneously within a temperature range, depending upon the shortening material used, in which the shortening will melt and remain molten without decomposing or burning and will cause the onion particles to brown or cook either completely or partially, depending upon the requirements of those who will partake of the completed product. The onion, of course, will soften during this cooking period. The lox, or marinated and smoked salmon, which has been sliced or subdivided into relatively smaller pieces as compared to the original slices, is then added to the so-heated and cooked mixture of shortening and onion pieces, and the cooking of the so-formed mixture is continued preferably while the mixture is being stirred. The onion used may be a red onion or Bermuda onion should a very strong onion flavor be desired. However, the milder yellow onion or the very mild white onion can also be used instead of the red onion, and, if desired, a mixture of the aforesaid several varieties of the various types of onions may be used, depending upon the final flavor desired. It has been found that, in any case cooking of the mixture for approximately three-quarters of an hour per two pounds of mixture of lox, shortening, and onion results in a desired fully cooked composition. After the mixture has been cooked or partially cooked, as the case may be, the composition is removed from the pan into preferably a foil container, the foil being preferably aluminum, and allowed to cool to room temperature. As a result of the heretofore described process, each of the onion particles and each of particles of the fish become thoroughly coated with the shortening material and there is formed a substantially homogeneous solid mass of onion particles and fish particles dispersed in the shortening material. The so-formed solid mass is then reduced to a temperature ranging from approximately 0° F. to —10° F. preferably within approximately 2 to 4 hours and may be held at a temperature within said range until ready to be used.

Said so-frozen mass, prior to using any portion thereof, is allowed to warm slowly, or thaw out, to room temperature. The portion desired is then removed from the mass and transferred to a pan and heated until the shortening is melted. The desired number of shelled eggs in accordance with the number of persons to be served is then added to said heated mass and heating is then continued as desired until the desired firmness of the heated mass is obtained at the required temperature. The finished or completed delicacy is then removed from the pan and served. I have found the final cooked composition of lox and eggs to possess and retain the flavor, natural juices, and taste characteristics of a freshly prepared portion of lox and eggs even though the lox, butter and onions had previously been prepared, as hereinbefore described.

The invention is further shown by the following examples which are illustrative only and are not considered to be limiting:

*Example 1*

The following ingredients are prepared:

| Ingredient: | Parts by weight |
|---|---|
| Onions (red or Bermuda) | 6 |
| Butter | 1 |
| Lox | 1 |

The onions are diced and washed. The butter and the onions are placed in a pan, and the mixture is slowly heated, while being stirred, until the butter is melted. The heating and stirring are continued simultaneously, and the temperature is so controlled that the butter remains molten and does not decompose, as by flaming, until the onions become soft and sufficiently browned, as desired. The lox, which has been subdivided into pieces approximately 4 to 5 times the size of the onion pieces, is then added slowly to the onion and melted butter mixture under constant stirring and while the temperature is so controlled that the butter remains molten. The heating is continued for approximately ¾ hour per approximately two pounds of said mixture of lox, onions and butter at said controlled temperature. The so-heated or cooked composition is then transferred into a container, preferably of a metallic foil material such as aluminum, and allowed to cool to room temperature. The so-prepared mass consists of onion and lox pieces thoroughly coated with and thoroughly dispersed in the butter, each so-coated particle being crisp and firm and contained in a solid mass of butter. The solid mass is then frozen to a temperature of from approximately 0° F. to —10° F., and may be frozen to —20° F., within approximately three hours and has been held at such temperatures for a period of 11 months with intermediate usage of portions thereof without any loss of its original flavor, natural juices, and taste characteristics.

The so-prepared mass has been used in the following manner to prepare a lox and egg dish from a portion thereof. A portion of the so-frozen mass is separated therefrom and allowed to thaw out, and the remainder of the unused mass is returned to the storage chamber and cooled to the hereinbefore set forth freezing temperature. The so-separated thawed out portion is heated until the butter becomes molten, and the so-heated portion is held at a constant temperature which is such that the butter remains without decomposing, as by flaming or burning. The so-heated mass is constantly stirred and a predetermined amount of shelled eggs, in accordance with the portion being prepared, is added to said mixture while same is kept at such a temperature that the butter remains molten and simultaneously kept under constant agitation. The cooking of the so-prepared mass is continued until the desired degree of preparation is attained. Here, again, the finally prepared dish is such that it retains the flavor, natural juices, and taste characteristics and appearance of a freshly prepared dish, even though the hereinbefore described mass has been subjected to freezing and storage for a long period of time.

*Example 2*

The ingredients are prepared as in Example 1 except that butter colored margarine is used in place of 95%, by weight, of the butter. The composition comprising the onions, the shortening, and lox is prepared as in Example 1, and the final dish including the eggs is likewise prepared as in Example 1. In each case the resulting product retains the flavor, natural juices and taste characteristics and appearance of a freshly prepared product and dish.

*Example 3*

The ingredients are prepared as in Example 1 except that a white hydrogenated vegetable oil shortening is used in place of 75%, by weight, of the butter. The frozen product and finally prepared dish containing the eggs retained the flavor, natural juices and taste characteristics and appearance of a freshly prepared product and dish.

The amounts of the various ingredients are determined in accordance with the characteristics including flavor, natural juices, and taste and appearance desired by the ultimate consumer of the product. The proportions of said ingredients to be used are such that sufficient quantities must be used and such that each particle of onion and lox or other meaty material will be thoroughly coated with and be dispersed in the shortening material. Also, the amount of each of the various ingredients to be used depends upon the degree of and type of stirring used in the preparation. As is quite obvious, the prime requirement is that sufficient quantities of component ingredients be used that each particle of onion and meaty material be thoroughly coated with and dispersed in the shortening material. Also, the specific temperatures to be used must be such that the shortening material be held molten without decomposing during the aforedescribed preparation.

It is preferable that butter in some amount be used as a portion of the shortening material to give the proper flavor, taste, and appearance.

I have for the first time prepared the heretofore described precooked frozen composition without the use of any synthetic additives, I have found that such composition can be preserved at below freezing temperatures for long periods of time by including therein both an edible bulb such as onion together with shortening material and thoroughly coating the onion and meaty material with the shortening material and thoroughly dispersing the so-coated onion and meaty material in the shortening material without the loss of the flavor, natural juices and taste characteristics of and change in appearance from a freshly prepared composition. Of particular note is the fact that the so-prepared composition can be frozen and thawed repeatedly without any loss of the flavor, natural juices and taste characteristics of and change in appearance from a freshly prepared composition.

The aforedescribed prepared frozen composition can also be used without eggs by merely heating a predetermined portion thereof, cooling, and then adding a food product such as cream cheese thereto to form a sandwich spread.

Many changes and alterations may be made without departing from the spirit and scope of this invention which is set forth in the appended claims which are to be construed as broadly as possible in view of the prior art.

I claim:

1. The method for preparing a frozen food composition which can be repeatedly thawed and refrozen without the loss of flavor, natural juices and taste characteristics of and without change in appearance from a freshly prepared composition comprising mixing thoroughly and cooking a mixture comprising a shortening and onion in particulate form and freezing said so-formed mixture.

2. A precooked frozen food comprising onion in particulate form and a shortening, said onion in particulate form being thoroughly coated with and dispersed in said shortening, whereby said frozen food can be repeatedly thawed and refrozen without the loss of flavor, natural juices, and taste characteristics of and without change in appearance from a freshly prepared composition, said product being made by the process of claim 1.

References Cited in the file of this patent

UNITED STATES PATENTS

| | | |
|---|---|---|
| 1,955,484 | Birdseye | Apr. 17, 1934 |
| 2,166,278 | Alderfer | July 18, 1939 |
| 2,541,701 | Karmen | Feb. 13, 1951 |
| 2,674,536 | Fisher | Apr. 6, 1954 |
| 2,768,086 | Bliley | Oct. 23, 1956 |
| 2,771,370 | Allen | Nov. 20, 1956 |
| 2,918,378 | Joiner | Dec. 22, 1959 |

OTHER REFERENCES

The Complete American Jewish Cook Book: 1952, by A. London et al., published by The World Publishing Company, New York, page 280, article entitled "Lox (Smoked Salmon) and Potato Casserole."

The New Settlement Cook Book: 1954, by S. Kander, published by Simon and Schuster, New York, page 336, article entitled "Smoked Salmon Snacks."